United States Patent
McNabb et al.

(10) Patent No.: US 10,974,696 B2
(45) Date of Patent: Apr. 13, 2021

(54) AUTHENTICATION MANAGER

(71) Applicant: FORD GLOBAL TECHNOLOGIES, LLC, Dearborn, MI (US)

(72) Inventors: David McNabb, Ann Arbor, MI (US); Shubham Sharma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/048,501

(22) Filed: Jul. 30, 2018

(65) Prior Publication Data

US 2020/0031314 A1    Jan. 30, 2020

(51) Int. Cl.
*B60R 25/24* (2013.01)
*B60R 25/23* (2013.01)
*H04L 29/06* (2006.01)

(52) U.S. Cl.
CPC .......... *B60R 25/23* (2013.01); *B60R 25/241* (2013.01); *H04L 63/0838* (2013.01); *H04L 63/0876* (2013.01)

(58) Field of Classification Search
CPC ... B60R 25/23; B60R 25/241; H04L 63/0838; H04W 4/44; H04W 12/06; G05D 1/0088; G05D 1/0285; G06Q 10/02
USPC ........................................................ 340/5.28
See application file for complete search history.

(56) References Cited

U.S. PATENT DOCUMENTS

| | | | |
|---|---|---|---|
| 6,850,153 B1 * | 2/2005 | Murakami | B60L 53/305 340/425.5 |
| 2003/0031025 A1 * | 2/2003 | Huizenga | B60Q 1/2669 362/501 |
| 2011/0112969 A1 | 5/2011 | Zaid et al. | |
| 2015/0338852 A1 * | 11/2015 | Ramanujam | G08G 1/202 701/2 |
| 2016/0019785 A1 * | 1/2016 | Zhang | G01C 21/3423 340/905 |
| 2017/0104589 A1 * | 4/2017 | Lambert | H04L 67/12 |
| 2017/0192428 A1 * | 7/2017 | Vogt | G05D 1/0038 |
| 2017/0272943 A1 | 9/2017 | Valasek et al. | |
| 2018/0053362 A1 | 2/2018 | Decke et al. | |

* cited by examiner

*Primary Examiner* — Vernal U Brown
(74) *Attorney, Agent, or Firm* — Gregory P. Brown; Brooks Kushman P.C.

(57) ABSTRACT

A vehicle includes a transceiver and a processor. The processor is programmed to generate a user identifier responsive to receipt of authentication rights to the vehicle via the transceiver, and responsive to occurrence of a scheduled time and location specified by the authentication rights, activate a phone key of the authentication rights corresponding to the user identifier with a key manager and activate a passcode of the authentication rights corresponding to the user identifier with a passcode manager.

21 Claims, 4 Drawing Sheets

US 10,974,696 B2

AUTHENTICATION MANAGER

TECHNICAL FIELD

Aspects of the disclosure generally relate to in-vehicle management of authenticated users to a shared or autonomous vehicle, using various methods of authentication.

BACKGROUND

Ride-sharing refers to a service that arranges shared rides for one or more persons in a vehicle. A ride-sharing user may use his or her smartphone or other mobile device to request a ride. Vehicle-sharing is a model of car rental where people rent cars for short periods of time, often by the hour. Such sharing systems may require authentication of drivers or riders so that the vehicles are only accessed by the correct passengers.

SUMMARY

In one or more illustrative embodiments, a vehicle includes a transceiver and a processor. The processor is programmed to generate a user identifier responsive to receipt of authentication rights to the vehicle via the transceiver, and responsive to occurrence of a scheduled time and location specified by the authentication rights, activate a phone key of the authentication rights corresponding to the user identifier with a key manager and activate a passcode of the authentication rights corresponding to the user identifier with a passcode manager.

In one or more illustrative embodiments, a method includes, responsive to receipt by a vehicle of a phone key and a passcode from a server, sending the phone key in an inactive state to a vehicle key manager and the passcode in the inactive state to a vehicle passcode manager; and responsive to occurrence of a scheduled time and location at the vehicle, activating the phone key with the key manager and the passcode with the passcode manager.

In one or more illustrative embodiments, a non-transitory computer-readable medium comprising instructions that, when executed by a processor of a vehicle, cause the vehicle to, responsive to receipt by a vehicle of a phone key and a passcode from a server, send the phone key in an inactive state to a vehicle key manager and the passcode in the inactive state to a vehicle passcode manager; and responsive to occurrence of a scheduled time and location at the vehicle, activate the phone key with the key manager and the passcode with the passcode manager.

DETAILED DESCRIPTION

Figure 1:
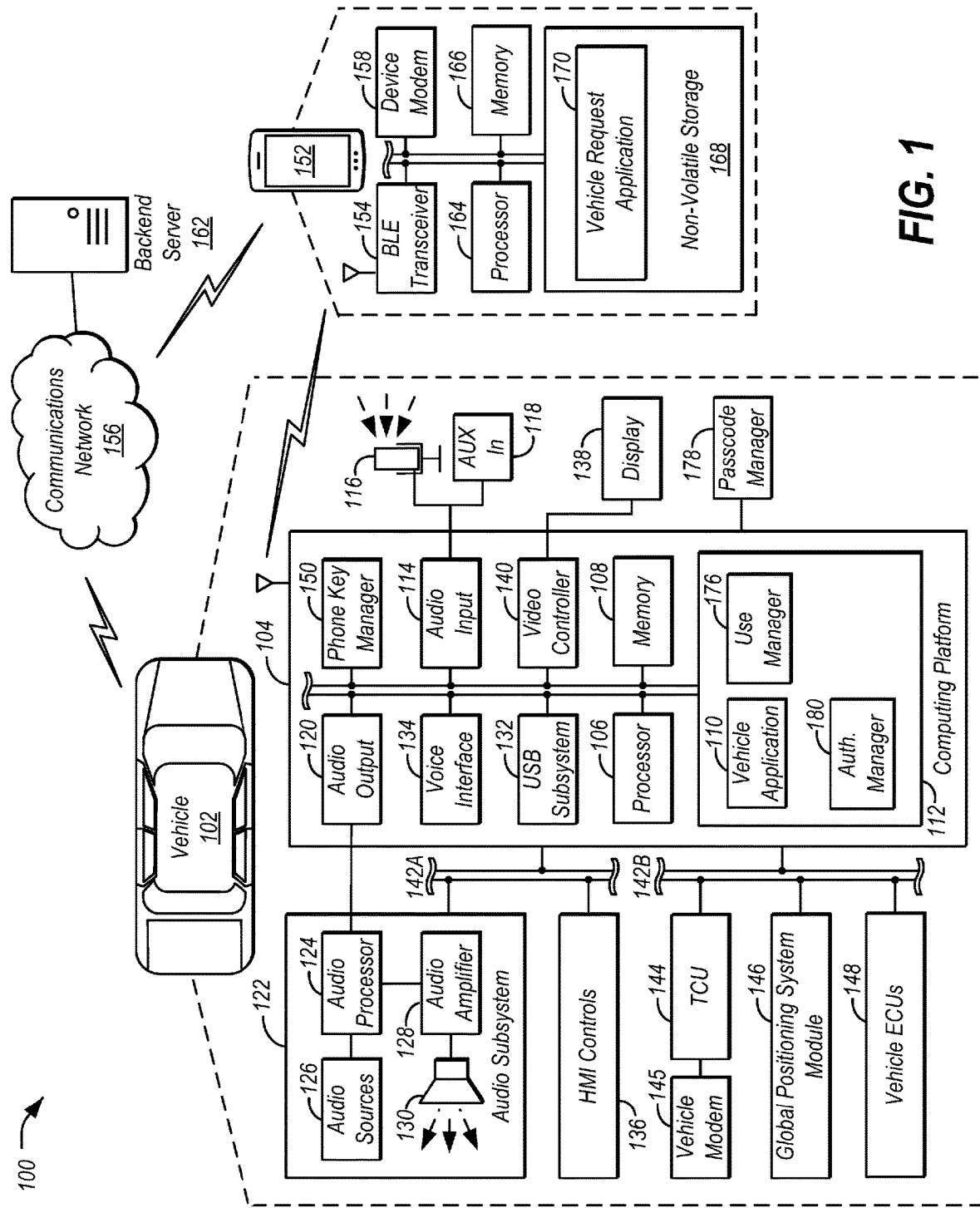
FIG. 1 illustrates an example diagram of a system configured to provide telematics services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Autonomous vehicles that provide services such as ride-hailing and goods delivery need to be able to authenticate and grant access to many users during a typical day. Users may only need access for as little as a few minutes, e.g., to drop off a package or ride from one part of a city or commute to another.

Systems of authentication used for retail vehicles, such as key fobs, passcode entry, and smartphones are designed for vehicle ownership models, where the vehicle's owner has access to the vehicle for the duration of ownership, which can be many years. To meet autonomous vehicle use cases, the vehicle needs to be able to dynamically grant and revoke access to the vehicle, in order to allow the intended users to access the vehicle when approved to do so, and prevent unintended users from accessing the vehicle when their access rights have expired or if they were never granted rights in the first place.

The vehicle may use multiple methods or technologies in order to authenticate users, but should be able to identify and manage the authentication status of all users regardless of which technology is used to authenticate. Authentication status may be used as an enabler to perform other vehicle functions that may be specific to the user, such as to display custom user messages on an in-vehicle display, or to unlock specific doors or compartments on the vehicle.

To meet the unique use cases for autonomous vehicles, an authentication manager for the vehicle is proposed. The authentication manager enables detailed coordination and control of access to the vehicle based on scheduled use of the vehicle. More specifically, the authentication manager may store a database of users that currently have or may be scheduled in the future to have authentication rights to the vehicle. The authentication manager may also store a database of past users for some duration (e.g., 4 weeks) with expectation they might be repeat customers (e.g., arrived from out of town and may return through the same mobility path). The authentication manager may receive requests to activate or deactivate a user's authentication rights, based on scheduled rides, deliveries, or service times, among other possibilities. The authentication manager also communicates with various authentication subsystems on the vehicle in order to enable or disable a user's ability to authenticate via each subsystem, and to add or remove authentication rights for each subsystem. The authentication manager also communicates with various authentication subsystems on the vehicle in order to track the authentication status of all users Actions on the vehicle can be triggered following verification with the authentication manager that an authenticated user is present. For example, prior to a vehicle leaving the start location, the authentication manager may be requested to confirm that all scheduled users have authenticated to the vehicle prior to departing.

Successful authentication to the vehicle may also cause the authentication manager to trigger an action on the vehicle, such as to unlock or power open a door.

Another use case for the authentication manager may be to suspend authentication of users. For example, if the vehicle is in motion and it is not safe to enter or exit the vehicle, the authentication manager could be provided with an alert from the vehicle motion controller or other subsystem. The authentication manager could then distribute a request to all authentication subsystems on the vehicle to suspend authentication until it is safe again to enter and exit.

With the inclusion of the authentication manager, the vehicle may receive authentication rights such as phone keys, passcodes, etc., and store them in an inactive state until activated at a later time by the authentication manager. Inactive means that the authentication rights cannot be used to authenticate a user until the authentication manager has activated them, based on a request received from the vehicle use manager that manages which users can access the vehicle based on parameters such as scheduled time and location. Further aspects of the disclosure are discussed in detail herein.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

A computing platform 104 may include a memory 108 and one or more processors 106 configured to perform instructions, commands, and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, JAVA, C, C++, C#, OBJECTIVE C, FORTRAN, PASCAL, JAVA SCRIPT, PYTHON, PERL, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and an auxiliary audio input 118 configured to receive audio signals from connected devices. The auxiliary audio input 118 may be a physical connection, such as an electrical wire or a fiber optic cable, or a wireless input, such as a BLUETOOTH audio connection or Wi-Fi connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio subsystem 122 having audio playback functionality. In other examples, the computing platform 104 may provide platform audio from the audio output 120 to an occupant through use of one or more dedicated speakers (not illustrated). The audio output 120 may include, as some examples, system generated chimes, pre-recorded chimes, navigation prompts, other system prompts, or warning signals.

The audio subsystem 122 may include an audio processor 124 configured to perform various operations on audio content received from a selected audio source 126 and to platform audio received from the audio output 120 of the computing platform 104. The audio processors 124 may be one or more computing devices capable of processing audio and/or video signals, such as a computer processor, microprocessor, a digital signal processor, or any other device, series of devices or other mechanisms capable of performing logical operations. The audio processor 124 may operate in association with a memory to execute instructions stored in the memory. The instructions may be in the form of software, firmware, computer code, or some combination thereof, and when executed by the audio processors 124 may provide audio recognition and audio generation functionality. The instructions may further provide for audio cleanup (e.g., noise reduction, filtering, etc.) prior to the processing of the received audio. The memory may be any form of one or more data storage devices, such as volatile memory, non-volatile memory, electronic memory, magnetic memory, optical memory, or any other form of data storage device.

The audio subsystem 122 may further include an audio amplifier 128 configured to receive a processed signal from the audio processor 124. The audio amplifier 128 may be any circuit or standalone device that receives audio input signals of relatively small magnitude, and outputs similar audio signals of relatively larger magnitude. The audio amplifier 128 may be configured to provide for playback through vehicle speakers 130 or headphones (not illustrated).

The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118. For instance, the audio sources 126 may also include Wi-Fi streamed audio, USB streamed audio, Bluetooth streamed audio, internet streamed audio, TV audio, as some other examples.

The computing platform 104 may utilize a voice interface 134 to provide a hands-free interface to the computing platform 104. The voice interface 134 may support speech recognition from audio received via the microphone 116 according to a standard grammar describing available command functions, and voice prompt generation for output via the audio subsystem 122. The voice interface 134 may utilize probabilistic voice recognition techniques using the standard grammar in comparison to the input speech. In many cases, the voice interface 134 may include a standard user profile tuned for use by the voice recognition functions to allow the voice recognition to be tuned to provide good results on average, resulting in positive experiences for the maximum number of initial users. In some cases, the system may be configured to temporarily mute or otherwise override the audio source specified by an input selector when an audio prompt is ready for presentation by the computing platform 104 and another audio source 126 is selected for playback.

The microphone 116 may also be used by the computing platform 104 to detect the presence of in-cabin conversations between vehicle occupants. In an example, the computing platform may perform speech activity detection, and then apply the results to a classification algorithm configured to classify the samples as either speech or non-speech. The classification algorithm may utilize various types of artificial intelligence algorithms, such as pattern matching classifiers, K nearest neighbor classifiers, as some examples.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, or a media oriented system transfer (MOST), as some examples. The in-vehicle networks 142 may allow the computing platform 104 to communicate with other vehicle 102 systems, such as a telematics control unit 144 having a vehicle modem 145, a global positioning system (GPS) module 146 configured to provide current vehicle 102 location and heading information, and various vehicle electronic control units (ECUs) 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors, and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio subsystem 122 and the HMI controls 136 may communicate with the computing platform 104 over a first in-vehicle network 142-A, and the telematics control unit 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a phone key manager 150 configured to communicate with a compatible transceiver 154 of the mobile device 152 (e.g., via BLUETOOTH Low Energy (BLE)). It should be noted that BLE is only one example, and in other examples, classic BLUETOOTH, ZIGBEE, Wi-Fi, or another short range wireless protocol may be used.

A communications network 156 may provide communications services, such as packet-switched network services (e.g., Internet access, VoIP communication services), to devices connected to the communications network 156. An example of a communications network 156 may include a cellular telephone network.

Mobile devices 152 may have network connectivity to the communications network 156 via a device modem 158 of the mobile device 152. The vehicle 102 may have network connectivity to the communications network 156 via the vehicle modem 145. To facilitate the communications over the communications network 156, mobile devices 152 and vehicle 102 may be associated with unique device identifiers (e.g., mobile device numbers (MDNs), Internet protocol (IP) addresses, etc.) to identify the communications of the mobile devices 152 over the communications network 156. In some examples, such as for vehicles 102 confined to a region (e.g., a resort or a city center), vehicles 102 communication may additionally or alternately be performed via Wi-Fi, dedicated short range communications (DSRC), or via another short to medium range connectivity solution.

Similar to the computing platform 104, the mobile devices 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the BLE transceiver 154 and with various network services via the device modem 158.

A vehicle request application 170 may be an example of such a mobile application. The vehicle request application 170 may be installed to the mobile device 152 to allow the mobile device 152 to request use of a vehicle 102. The vehicle request application 170 may also cause the mobile device 152 to communicate with the vehicle 102 via the BLE transceiver 154 or another wireless technology, or an optical technology such as Li-Fi, or an audible technology.

A backend server 162 may include various types of computing apparatus, such as a computer workstation, a server, a desktop computer, a virtual server instance executed by a mainframe server, or some other computing system and/or device. Similar to the computing platform 104, the backend server 162 may include a memory on which computer-executable instructions may be maintained, where the instructions may be executable by one or more processors of the backend server 162. As discussed in detail below, the backend server 162 may be configured to schedule and manage the use of the vehicles 102, receive vehicle 102 usage requests from users, and assign an available vehicle 102 to a user. The backend server 162 may also be configured to generate and/or store authentication rights and associated metadata, such as cryptographic keys that are used to authenticate the user's mobile device 152 to the vehicle 102, passcodes that a user may enter on a vehicle 102 exterior display or button matrix, and other potential data used for authentication, such as biometric data. The backend server 162 may communicate with the mobile device 152 and the vehicles 102 via the communications network 156.

A use manager application 176 may be an example of a vehicle application 110 installed to the storage 112 of the computing platform 104. When executed by the vehicle 102, the use manager application 176 may cause the vehicle 102 to manage scheduled trips for the vehicle 102. Trip data for the trips may include start and end locations, scheduled start and end times, and data identifying user(s) that have authentication rights to the vehicle 102 in association with the scheduled usage. While the use manager application 176 is shown as a software application installed to the computing platform 104, in other examples use management may be handled by a dedicated electronic control unit (ECU) or part of another ECU that provides additional vehicle 102 functionality. Moreover, the vehicle 102 may have one or more uses including rides, package drop-off, package pickup, as well as designated service times. Each use could have a separate service that manages it, or all services could be managed by a single use manager.

The phone key manager 150 may include an in-vehicle authentication subsystem that communicates with the mobile device 152 of the user via BLUETOOTH Low Energy, BLUETOOTH Classic, Wi-Fi, or some other wireless communication method. The phone key manager 150 may also be an independent ECU or part of another ECU that provides additional vehicle 102 functionality.

A passcode manager 178 may include an in-vehicle authentication subsystem configured to receive alphanumeric input data from an input device accessible on the exterior of the vehicle, such as a keypad or touchscreen. This input data may be compared against a stored passcode to authenticate a user and provide access to the vehicle 102.

An authentication manager 180 may be another example of a vehicle application 110 installed to the storage 112 of the computing platform 104. In other examples, the authentication manager 180 may be an independent ECU or part of another ECU that provides additional vehicle 102 functionality. As described in detail below, the authentication manager 180 may enables detailed coordination and control of access to the vehicle 102 based on scheduled use of the vehicle 102.

Figure 2:
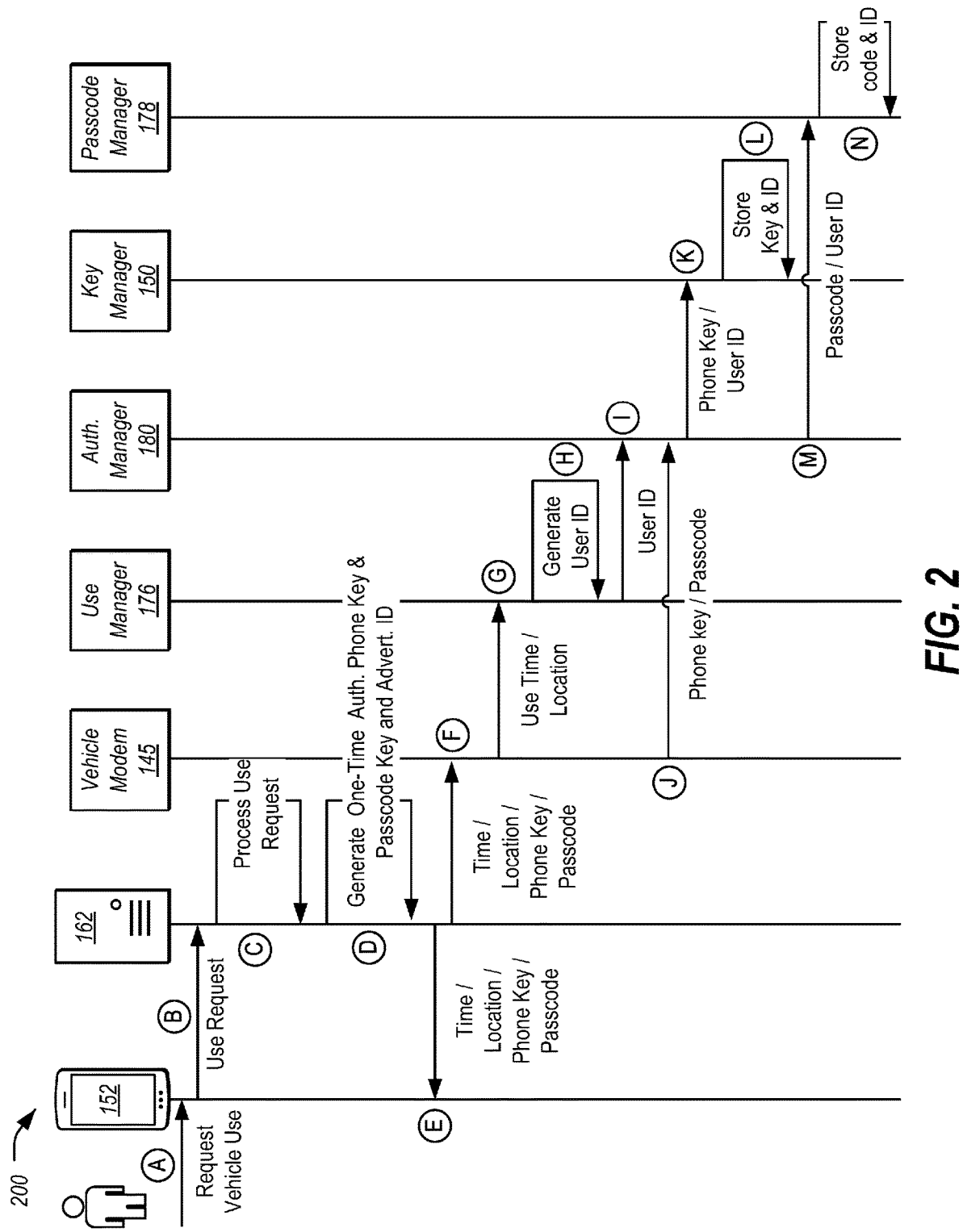
FIG. 2 illustrates an example data flow diagram for requesting use of a vehicle.

FIG. 2 illustrates an example data flow diagram 200 for requesting use of a vehicle 102. The diagram 200 begins at index (A) with a user requesting a ride using the vehicle request application 170 on the mobile device 152. In doing so, the user may provide information such as time and day of pickup and pickup location. At index (B) this request may be sent from the mobile device 152 to the backend server 162 via the communications network 156.

Responsive to receipt of the request, at index (C) the backend server 162 processes the user request to determine a suitable vehicle 102 in the fleet, a location, and a time to fulfill the user request. At index (D) the backend server 162 may generate authentication rights to the user, such as a cryptographic key for the mobile device 152 (e.g., phone) and/or a passcode.

At index (E), the authentication rights and usage details (e.g., day/time, location, etc.) may be sent to the mobile device 152 for approval. At index (F), the authentication rights and usage details (e.g., day/time, location, etc.) may also be sent to the vehicle 102. In an example, the information be may be sent to the vehicle 102 and the mobile device 152 through the communications network 156 to the vehicle modem 145.

At index (G), the vehicle modem 145 sends the usage time and location details to the use manager 176. At index (H), the use manager 176 also generates a user ID to associate the usage details with one or more users. At index (I), the use manager 176 provides the user ID to the authentication manager 180, to cause the authentication manager 180 to associate the user ID with the received authentication rights data received from the vehicle modem 145 at index (J).

At index (K), the authentication manager 180 distributes the authentication rights and user ID to the phone key manager 150, which stores the rights and user ID at index (L). At index (M), the authentication manager 180 distributes the authentication rights to the passcode manager 178, and other authentication subsystems if used, along with the user ID. The passcode manager 178 stores the rights and user ID at index (N). Importantly, the authentication rights may be delivered in an inactive state by default, meaning that they cannot be currently used to authenticate a user. This allows authentication rights to be distributed in advance of a scheduled time, for example, if a vehicle 102 downloads the day's schedule of uses at the beginning of the day. In this case, the authentication rights for all users that are scheduled to use the vehicle 102 during the day can be stored on the vehicle 102. This protects against the possibility that the vehicle 102 is out of communication with the backend server 162 for a period of time due to poor cellular connectivity, service disruption, or some other cause.

Figure 3:
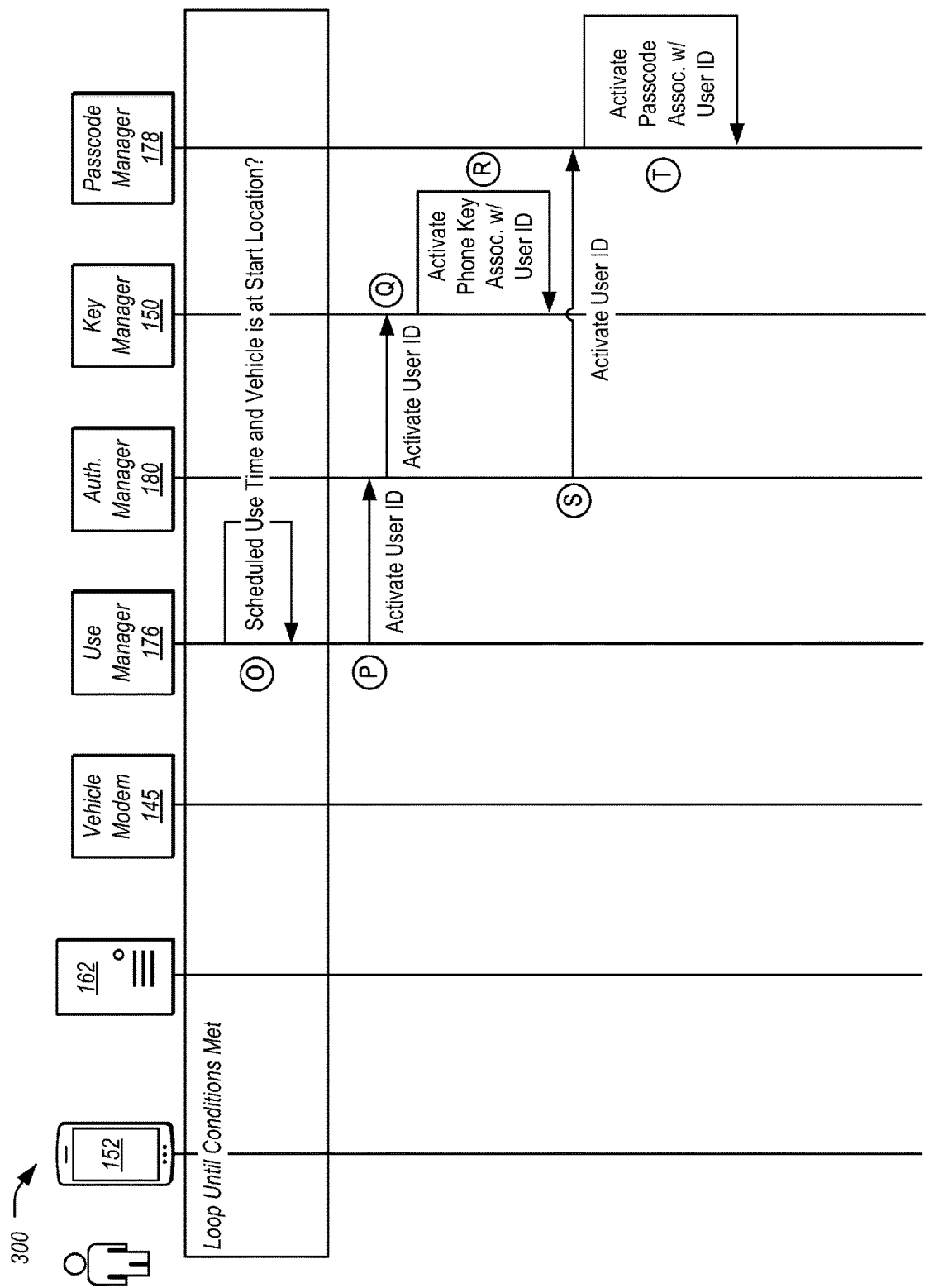
FIG. 3 illustrates an example data flow diagram for activating use of the vehicle for an authorized user.

FIG. 3 illustrates an example data flow diagram 300 for activating use of the vehicle 102 for an authorized user. As shown at index (0), the use manager 176 waits for the vehicle 102 to travel to the requested start location, and for the scheduled time to have started. Responsive to occurrence of those conditions, at operation (P), the use manager 176 requests the authentication manager 180 to activate the user(s) associated with the ride, etc. based on the user IDs. At operation (Q), the authentication manager 180 sends a request to the phone key manager 150, to cause the key manager 150 to activate the authentication rights based on the user ID at operation (R). At operation (S), the authentication manager 180 sends a request to the passcode manager 178, to cause the passcode manager 178 to activate the authentication rights based on the user ID at operation (T). If the user proceeds to authenticate to the vehicle, e.g., by entering the passcode, the passcode manager 178 can report which user ID has been authenticated and provide the status to the authentication manager 180. The authentication manager 180 is then able to track the authentication state of every user assigned to the vehicle 102 and determine which users are currently authenticated to the vehicle 102.

Figure 4:
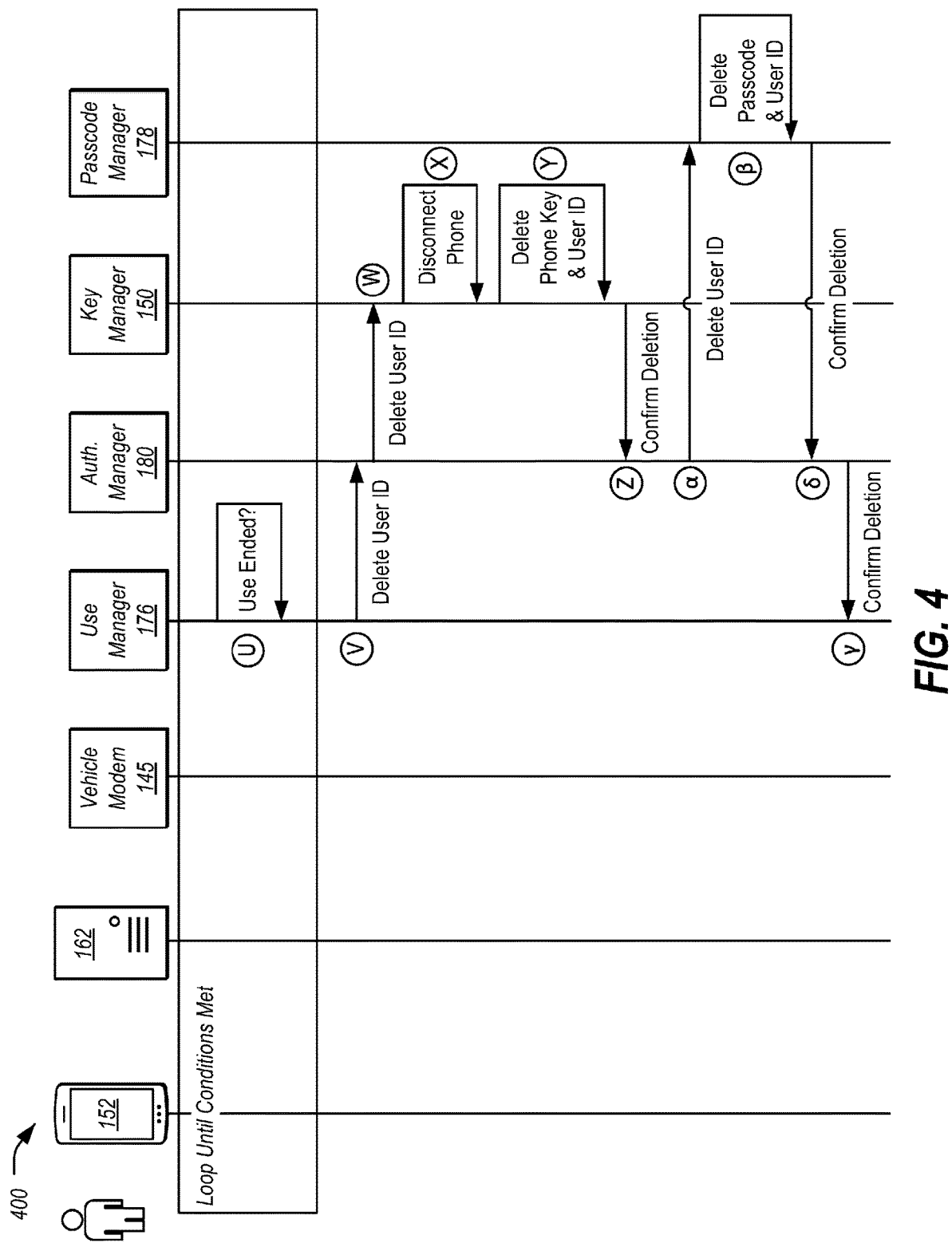
FIG. 4 illustrates an example data flow diagram for deactivating use of the vehicle for an authorized user.

FIG. 4 illustrates an example data flow diagram 400 for deactivating use of the vehicle 102 for an authorized user. As shown at index (U), the use manager 176 confirms that the scheduled use is completed and the user no longer should have access to the vehicle 102. As some examples, the use manager 176 may confirm one or more of the following: that the vehicle 102 reaches the planned destination, that the scheduled end time for usage has been reached, that the user's mobile device 152 is not connected to the vehicle 102, that a camera-based interior scan of the vehicle 102 does not detect any person in the vehicle 102, that seat occupancy sensors confirm no users are within the vehicle 102, or that the user has ended the scheduled use by performing an action on the connected mobile device 152 or performing an action on the vehicle 102 such as pressing a dismissal button or closing the door. As a further example, the vehicle 102 may determine that the user's mobile device 152 is no longer inside the vehicle 102 using triangulation or other methods of estimating the location of the mobile device 152 communicating wirelessly with the vehicle 102.

Responsive to occurrence of one or more of those conditions, at operation (V), the use manager 176 sends another request to the authentication manager 180 to deactivate or remove the authentication rights for the user.

For instance, at operation (W), the authentication manager 180 sends a request to the phone key manager 150, to cause the key manager 150 to delete (or deactivate without deletion) the authentication rights based on the user ID. Responsive to receipt of the message, the key manager 150 may disconnect the mobile device 152 at operation (X), and delete (or deactivate) the phone key and user ID at operation (Y). The passcode manager 178 may confirm deletion (or deactivation) of the information to the authentication manager 180 at operation (Z). At operation ($\alpha$), the authentication manager 180 sends a request to the passcode manager 178, to cause the passcode manager 178 to delete (or deactivate) the phone key and user ID at operation ($\beta$). The passcode manager 178 may confirm deletion (or deactivation) of the information to the authentication manager 180 at operation ($\delta$). Upon receipt of indication of deletion (or deactivation) from the components, the authentication manager 180 may confirm the deletion back to the use manager 176 at operation ($\gamma$).

Having the ability to activate and deactivate authentication rights based on time and location is especially important for authentication methods like a passcode, where the passcode can be used by anyone with knowledge of it. This additional security measure helps to prevent unscheduled and/or unauthorized usage of the passcode.

In the case of a situation where the intended vehicle 102 is no longer available and a different vehicle 102 is assigned to the user (e.g., intended vehicle 102 is in an accident or needs to refuel or recharge), replacement authentication rights to the new vehicle 102 may be generated or retrieved by the backend server 162 and sent as an update to the user's mobile device 152 and to the replacement vehicle 102, while the previous authentication rights to the original vehicle 102 may be revoked from the mobile device 152 and the original vehicle 102. Some authentication rights, such as phone keys, must be replaced and resent because they should not be stored on the backend server 162 or transferred from one vehicle 102 to another due to security risks.

Thus, by using the described systems and methods, authentication rights and use schedules can be provided and stored on the vehicle 102 in advance of scheduled uses, in case of potential disruption of communication between the vehicle 102 and the backend server 162. Additionally, authentication rights may be stored on the vehicle 102 in an inactive state, preventing them from being used to authenticate and access the vehicle 102 until the associated use time has been scheduled, providing added security. Moreover, authentication rights may be managed by a single component on the vehicle 102, which can receive and process requests for use, as well as coordinate adding, removing, activating, and deactivating authentication rights for all methods of authentication on the vehicle 102, and determine the current authentication status of all users.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C#, VISUAL BASIC, JAVA SCRIPT, PERL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a transceiver; and
a processor programmed to
receive, to the vehicle via the transceiver, authentication rights as a download of a schedule of uses of the vehicle for a day, the schedule of uses including a plurality of uses for the day,
generate one or more user identifiers responsive to receipt of the authentication rights to the vehicle, and
responsive to occurrence of a scheduled time and location specified by the schedule of uses of the authentication rights, activate a phone key of the authentication rights corresponding to one of the user identifiers with a key manager and activate a passcode of the authentication rights corresponding to the one of the user identifiers with a passcode manager, such that the phone key and passcode can be used for authentication once activated but not before being activated.

2. The vehicle of claim 1, wherein the passcode is a one-time use key.

3. The vehicle of claim 1, wherein the processor is further programmed to delete the authentication rights from the vehicle responsive to completion of the access to the vehicle.

4. The vehicle of claim 3, wherein the processor is further programmed to determine completion of the access to the vehicle responsive to one or more of expiration of a period of time specified by the trip information, or movement of the vehicle to a destination location specified by the trip information.

5. The vehicle of claim 1, wherein the passcode manager includes a keypad accessible on an exterior of the vehicle and configured to receive the passcode via user input to the keypad.

6. The vehicle of claim 1, wherein the passcode manager includes a touchscreen accessible on an exterior of the vehicle and configured to receive the passcode via user input to the touchscreen.

7. The system of claim 1, wherein the processor is further programmed to receive the schedule of uses for the day at a beginning of the day.

8. The system of claim 1, wherein the processor is further programmed to:
responsive to occurrence of a second scheduled time and second location specified by the schedule of uses of the authentication rights, activate a second phone key of the authentication rights corresponding to a second one of the user identifiers with the key manager and activate a second passcode of the authentication rights corresponding to the second one of the user identifiers with the passcode manager, such that the second phone key and second passcode can be used for authentication once activated but not before being activated.

9. A method comprising:

responsive to receipt, by a vehicle from a server, of a phone key, a passcode, and a schedule of uses of the vehicle for a day, the schedule of uses including a plurality of uses for the day, sending the phone key in an inactive state to a vehicle key manager and the passcode in the inactive state to a vehicle passcode manager, such that, when in the inactive state, the phone key and passcode cannot be used for authentication; and responsive to occurrence of a scheduled time and location at the vehicle as indicated by the schedule of uses, activating the phone key with the key manager and the passcode with the passcode manager, such that once activated, the phone key and passcode can be used for authentication.

10. The method of claim 9, further comprising:

generating a user identifier corresponding to the phone key and passcode; and activating the phone key with the key manager and the passcode with the passcode manager by indicating the user identifier to the key manager and the passcode manager.

11. The method of claim 9, wherein the passcode manager includes a keypad, and further comprising:

receiving the passcode via user input to the keypad; and validating the passcode based on the activating having occurred.

12. The method of claim 9, wherein the passcode manager includes a touchscreen, and further comprising receiving the passcode via user input to the touchscreen.

13. The method of claim 9, further comprising deleting the authentication rights from the vehicle responsive to completion of the access to the vehicle.

14. The method of claim 13, further comprising determining completion of the access to the vehicle responsive to one or more of expiration of a period of time specified by the trip information, or movement of the vehicle to a destination location specified by the trip information.

15. A non-transitory computer-readable medium comprising instructions that, when executed by a processor of a vehicle, cause the vehicle to:

responsive to receipt, by a vehicle from a server, of a phone key, a passcode, and a schedule of uses of the vehicle for a day, the schedule of uses including a plurality of uses for the day, send the phone key in an inactive state to a vehicle key manager and the passcode in the inactive state to a vehicle passcode manager, such that, when in the inactive state, the phone key and passcode cannot be used for authentication; and responsive to occurrence of a scheduled time and location at the vehicle as indicated by the schedule of uses, activate the phone key with the key manager and the passcode with the passcode manager, such that once activated, the phone key and passcode can be used for authentication.

16. The medium of claim 15, further comprising:

generating a user identifier corresponding to the phone key and passcode; and activating the phone key with the key manager and the passcode with the passcode manager by indicating the user identifier to the key manager and the passcode manager.

17. The medium of claim 15, wherein the passcode manager includes a keypad, and further comprising receiving the passcode via user input to the keypad.

18. The medium of claim 15, wherein the passcode manager includes a touchscreen, and further comprising receiving the passcode via user input to the touchscreen.

19. The medium of claim 15, further comprising deleting the authentication rights from the vehicle responsive to completion of the access to the vehicle.

20. The medium of claim 19, further comprising determining completion of the access to the vehicle responsive to one or more of expiration of a period of time specified by the trip information, or movement of the vehicle to a destination location specified by the trip information.

21. The medium of claim 15, further comprising deactivating the authentication rights from the vehicle responsive to completion of the access to the vehicle.

\* \* \* \* \*